No. 749,096. PATENTED JAN. 5, 1904.
L. RENAULT.
MOTOR VEHICLE.
APPLICATION FILED SEPT. 10, 1903.
NO MODEL.

Witnesses
James L. Norris, Jr.
Robert Everitt,

Inventor:
Louis Renault,
By James L. Norris
Atty.

No. 749,096.

Patented January 5, 1904.

UNITED STATES PATENT OFFICE.

LOUIS RENAULT, OF BILLANCOURT, FRANCE.

MOTOR-VEHICLE.

SPECIFICATION forming part of Letters Patent No. 749,096, dated January 5, 1904.

Application filed September 10, 1903. Serial No. 172,658. (No model.)

*To all whom it may concern:*

Be it known that I, LOUIS RENAULT, engineer, a citizen of the French Republic, residing at 139 Rue du Point du Jour, Billancourt, department of Seine, France, have invented certain new and useful Improvements in Connections with the Fore-Carriage Axles of Motor Road-Vehicles, of which the following is a specification.

This invention relates to the fore-carriage axles of motor road-vehicles, and has for its object to provide tubular axles and sockets having a strength equal to that of a solid axle forged in one with the sockets, the method according to this invention dispensing with brazing of the parts, an operation which is always unsatisfactory when working parts have to be of great strength.

Figure 1:
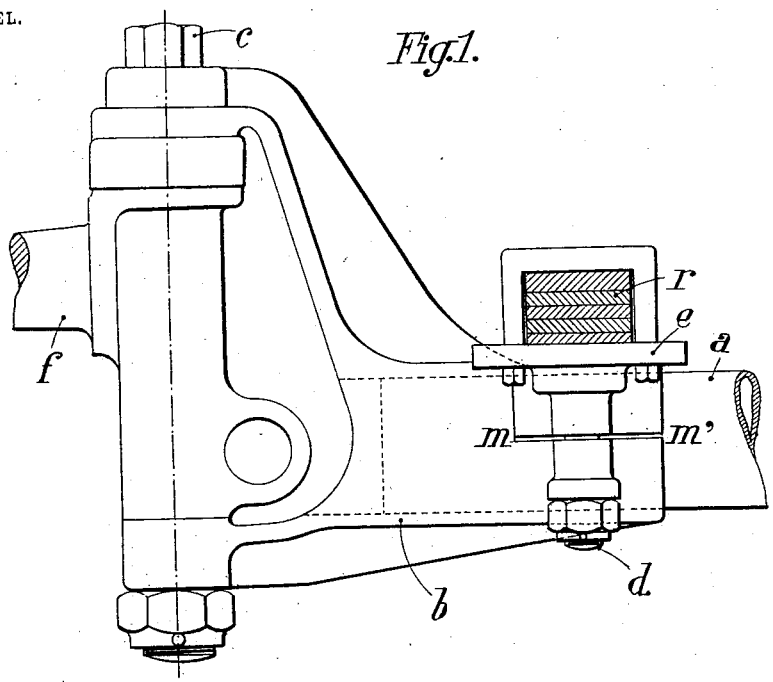
Figure 2:
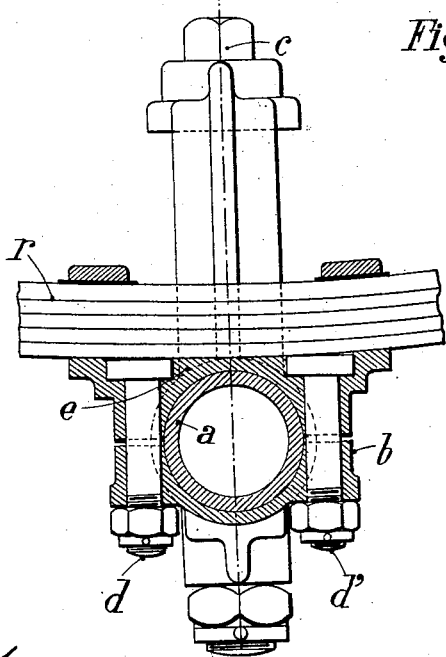

In the accompanying drawings, Figure 1 is an elevation of the socket and of an end of the tubular axle. Fig. 2 is a transversal section of the tubular axle which passes through the axle of the spring-buckle.

In carrying out this invention each end of the tubular axle $a$ is introduced into a socket $b$, having a forked end carrying the vertical pivot $c$ of the wheel-journal $f$. Part of the length of the upper half of the socket $b$ is cut off and replaced by a bearing-plate or saddle fitting the upper half of the tubular axle $a$ and forming the lower part of the bearing-spring buckle $e$. Bolts and nuts $d$ and $d'$ connect the bottom part of the spring-buckle $e$ with the socket $b$ and cause the socket and bottom part of the spring-buckle to firmly grip the tubular axle $a$, so that the said axle cannot turn in the socket. As the grip between these parts can be very great, the connection thus obtained between the axle $a$, socket $b$, and spring-buckle $e$ can be as strong as though the said parts were all made in one by forging. To allow the grip to be increased to any desired extent, some "play" is left in $m\ m'$ between the lower half of the socket $b$ and the lower part of the spring-buckle $e$. The tubular axle $a$ may be expanded in the socket $b$; but as the lower part of the bearing-spring buckle is maintained horizontal by the bearing-spring $r$ the socket cannot turn on the axle whether the bolts $d$ connecting the socket to the spring-buckle be properly tightened or not.

Having thus described my invention, what I claim is—

1. In the fore-carriage of a vehicle, the combination of a bracket having one of its ends provided with an axle-socket and having a portion of its length cut away, a saddle mounted on said cut-away portion adapted to form a bearing for the springs of the vehicle, said saddle provided with means for retaining the springs in place thereon, and means for securing said saddle to the bracket and thereby retaining the axle in said socket.

2. In the fore-carriage of a vehicle, the combination of a spindle-supporting bracket having one of its ends provided with an axle-receiving socket and having a portion of its length cut away, said bracket further provided with vertically-extended openings, a saddle mounted on said cut-away portion and adapted to form a bearing for the springs of the vehicle, said saddle provided with vertically-extending openings registering with the openings in said brackets and with eyes for receiving the springs of the vehicle, and means extending through said vertically-extending openings for securing said saddle to the bracket thereby retaining the axle in said socket.

3. In the fore-carriage of a vehicle, the combination of a spindle-supporting bracket having one of its ends provided with an axle-receiving socket and having a portion of its length cut away, said bracket provided with vertically - extending openings, a saddle mounted upon the cut-away portion and adapted to form a bearing for the springs of the vehicle, said saddle provided with vertically-extending openings registering with the openings in said bracket and with means for retaining the springs in place, and means extending through the said vertically-extending openings for clamping the saddle to the bracket thereby retaining the axle in said socket.

4. In the fore-carriage of a vehicle, a fork-shaped spindle-supporting bracket having its horizontal member provided with an axle-receiving socket, said latter member having its free end formed in a semicylindrical manner, a semicylindrical-shaped saddle mounted on the semicylindrical portion of the bracket and adapted to form a bearing for the springs of the vehicle, said saddle provided with eyes for receiving the springs of the vehicle, and means for securing said saddle to the bracket for clamping the axle in said socket.

5. In the fore-carriage of a vehicle, a spindle-supporting bracket having its free end provided with an axle-receiving socket, said free end further formed in a semicylindrical manner and provided with vertically-extending openings, a semicylindrical-shaped saddle mounted on the semicylindrical portion of the bracket and adapted to form a bearing for the springs of the vehicle, said saddle provided with eyes for retaining said springs in position and further provided with vertically-extending openings registering with the openings in the semicylindrical portion of the bracket, and bolts extending through said vertical openings for securing the saddle to the bracket thereby clamping the axle in said socket.

6. In the fore-carriage of a vehicle, a spindle-supporting bracket having its free end provided with an axle-receiving socket, said latter end having a portion of its length formed in a semicylindrical manner, a semicylindrical-shaped saddle mounted on the semicylindrical portion of the bracket and adapted to form a bearing for the springs of the vehicle, said saddle further provided with means for securing the springs in place thereon, and means for securing said saddle to the bracket thereby clamping the axle in said socket.

7. In the fore-carriage of a vehicle, the combination of a spindle-supporting bracket having one of its ends provided with an axle-receiving socket and having a portion of its length cutaway, a saddle mounted on said cut-away portion and adapted to form a bearing for the springs of the vehicle, said saddle further provided with eyes for retaining the springs of the vehicle in place, and means for securing the saddle to the bracket, thereby retaining the axle in said socket.

In testimony whereof I have hereunto set my hand in presence of two subscribing witnesses.

LOUIS RENAULT.

Witnesses:
   PAUL F. PÁQUET,
   G. L. CISRE.